(12) United States Patent  
Park

(10) Patent No.: US 6,666,599 B2  
(45) Date of Patent: Dec. 23, 2003

(54) CARRIAGE ASSEMBLY OF PRINTER EMPLOYING MOVABLE PRINT HEAD

(75) Inventor: Jin-ho Park, Yongin (KR)

(73) Assignee: SamSung Electronics Co., Ltd., Suwon (KR)

(*) Notice: Subject to any disclaimer, the term of this patent is extended or adjusted under 35 U.S.C. 154(b) by 50 days.

(21) Appl. No.: 09/896,113

(22) Filed: Jul. 2, 2001

(65) Prior Publication Data

US 2002/0110398 A1 Aug. 15, 2002

(30) Foreign Application Priority Data

Feb. 13, 2001 (KR) .......................................... 2001-6980

(51) Int. Cl.$^7$ ............................................... B41J 11/22
(52) U.S. Cl. ..................... 400/354; 400/354.1; 400/283; 347/37
(58) Field of Search .......................... 347/37; 400/283, 400/352, 354, 354.1, 354.2, 354.3

(56) References Cited

U.S. PATENT DOCUMENTS 5,332,321 A    7/1994  Beauchamp et al.
5,887,994 A  * 3/1999  Nomura et al. ............. 400/352
6,340,221 B1 * 1/2002  Driggers et al. ............. 347/37

FOREIGN PATENT DOCUMENTS

EP          1 013 457       6/2000

* cited by examiner

Primary Examiner—Daniel J. Colilla
Assistant Examiner—Jill E. Culler
(74) Attorney, Agent, or Firm—Robert E. Bushness, Esq.

(57) ABSTRACT

In a carriage assembly of a printer employing a movable print head, bosses provided with respective bearing supporting holes, each inner circumferential surface of which has a predetermined radius of curvature, are formed at a side of a carriage, and bearing bushings, each of which has an outer circumferential surface having a different predetermined radius of curvature corresponding to that of the bearing supporting hole, are also formed so as to make a spherical pair with the bearing supporting hole. A shaft through-hole, through which a guiding rod is inserted slidably, is formed through each bearing bushing. The bearing bushing can rotate freely in the bearing supporting hole, and therefore, the axes of the carriage assembly and the guiding rod can be aligned automatically.

19 Claims, 7 Drawing Sheets

CARRIAGE ASSEMBLY OF PRINTER EMPLOYING MOVABLE PRINT HEAD

CLAIM OF PRIORITY

This application makes reference to, incorporates the same herein, and claims all benefits accruing under 35 U.S.C. §119 from my application entitled CARRIAGE ASSEMBLY OF RECIPROCATING PRINTER HEAD filed with the Korean Industrial Property Office on Feb. 13, 2001 and there duly assigned Ser. No. 2001/6980.

BACKGROUND OF THE INVENTION

1. Field of the Invention

The present invention relates to a printer employing a movable print head, and more particularly, to a carriage assembly of a printer employing a movable print head, which has an improved structure capable of minimizing unstable movement of the carriage, and error in the concentricity of contacting portions of the carriage and a guiding rod.

2. Description of the Related Art

A carriage for a carriage assembly has to move along a guiding rod to print the full width on a sheet of recording medium. Carriages can be made of metallic material but this provides a heavy load to the guiding rod. Therefore carriages are generally made out of synthetic resin made by injection molding or machining. In addition, the resin contains an expensive fluoride additive to the resin to provide high lubricity between the carriage and the guiding rod. Unfortunately, this fluoride additive is used to produce the entire carriage instead of just the portions of the carriage that are in contact with the guiding rod resulting in expensive manufacturing costs to make a carriage.

Occasionally, two bosses, each being perforated by a hole, are needed in the design of the carriage. Often, the two bosses, and thus the two holes, are spaced apart by a distance. As is often the case, these two holes are not perfectly aligned to allow a straight guiding rod to easily and smoothly pass through. What is needed is a mechanism that is easy and inexpensive to manufacture, and that can allow a guiding rod to smoothly and frictionlessly pass through both holes of a carriage of a print head, even when the two holes are not aligned perfectly.

SUMMARY OF THE INVENTION

It is therefore an object of the present invention to provide a carriage assembly of a printer employing a movable print head, which has an improved structure capable of reducing friction between a carriage and a guiding rod.

It is also an object of the present invention to provide a structure for a carriage assembly that aligns the axes of the carriage and the guiding rod with each other.

It is yet another object of the present invention to provide bushings that attach to a carriage rod, the bushings being coextensive with the width of the bosses of the carriage.

It is still another object of the present invention to provide a carriage assembly that is not spring loaded by a coil spring between the bosses and around the guiding rod.

It is a further object of the present invention to provide spring type supporting plates that attach to the bosses and bushings to force the bushings to remain in sockets in the bosses.

It is yet another object of the present invention to provide a carriage having bosses which are perforated by a hole, the side walls of the hole tracing out a portion of a sphere, the outer surface of the bushings that fit within the hole in the bosses tracing out a surface of a sphere that is concentric to the sphere of the sidewalls of the hole in the bosses such that the radiuses of the two spheres differ substantially so as to allow the guiding rod to rotate in various directions when fitted into one hole in a boss.

It is also an object of the present invention to provide a carriage for a carriage assembly having a print head, the carriage being light weight, inexpensive to manufacture and essentially frictionless where the carriage meets the guiding rod.

Accordingly, to achieve the above objects, there is provided a carriage assembly of a printer employing a cartridge with a movable print head, and which is supported by a guiding rod. A carriage is installed to be movable within a predetermined distance along the guiding rod, the carriage assembly including a pair of bosses provided at each side of the carriage so as to be spaced a predetermined distance from each other, the bosses being perforated by bearing supporting holes, each inner circumferential surface of which is formed to have a predetermined radius of curvature, and a plurality of bearing bushings installed in the respective bearing supporting holes of the bosses, each outer circumferential surface of which has a different predetermined radius of curvature corresponding to that of the boss hole so as to make a spherical pair with the corresponding boss hole, each bearing bushing being provided with a shaft throughhole through which the guiding rod can pass slidably.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
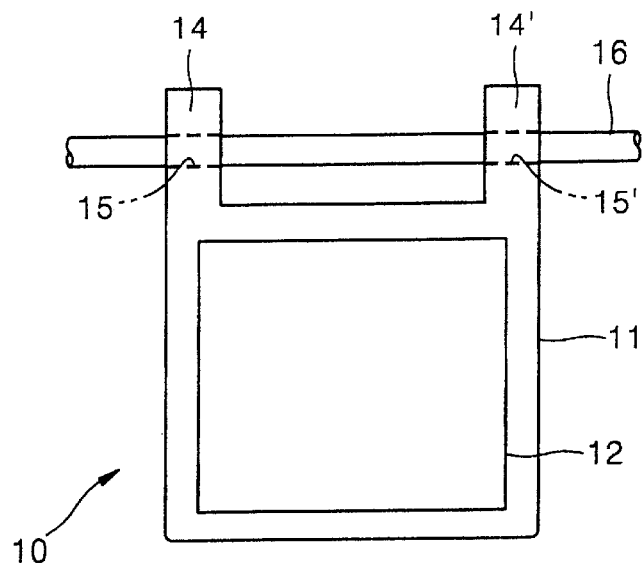
FIG. 1 is a plan view illustrating a carriage assembly for a cartridge having a movable print head.

FIGS. 1 through 3C are generic conventional structures for a carriage assembly of a printer employing a movable printhead. Turning to FIG. 1, FIG. 1 is a plan view illustrating a carriage assembly for a cartridge having a movable print head. Referring to FIG. 1, a carriage assembly for a cartridge having a movable print head comprises a guiding rod 16 and a carriage 10 which is installed to be movable within a predetermined range along the guiding rod 16, and into which a cartridge having a print head 12 is installed.

The carriage 10 includes a main body 11 into which the print head 12 is installed, and bosses 14 and 14' extend from the main body 11 and are provided with respective shaft holes 15 and 15' so that the guiding rod 16 can be installed so as to be spaced a predetermined distance from the main body 11 while passing through the shaft holes 15 and 15'.

Since the carriage 10 moves from side to side along the guiding rod 16, friction occurs between the carriage 11 and the guiding rod 16. Accordingly, the carriage 11 and the guiding rod 16 are required to be made of wearproof materials having a low value of a coefficient of friction between them.

Therefore, resin additives of a relatively high price, such as a fluoride additive or the like, are used to give high lubricity to a carriage usually formed by injection molding of a synthetic resin, and, actually, the whole body of a carrier is made of a high price material to give high lubricity to the portions in which friction occurs.

In addition, even though the problem of lubricity is solved, the clearance between the guiding rod 16 and the shaft holes 15 and 15' of the carriage 10 must be minimized, and it is very difficult to align with each other the central axes of the two shaft holes 15 and 15' which are spaced a predetermined distance from each other.

Figure 2A:
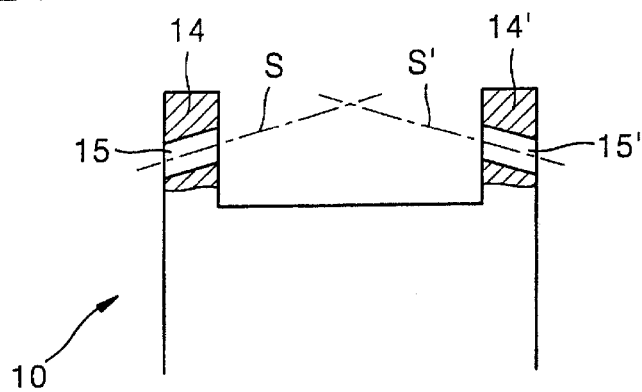
FIG. 2A is a sectional view illustrating disparity in the central axes of shaft holes of a carriage assembly.
Figure 2B:
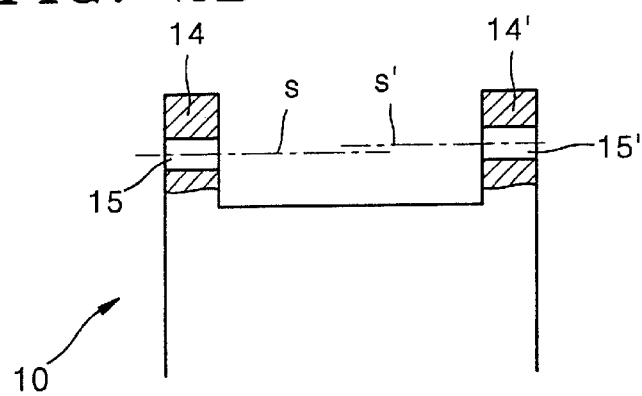
FIG. 2B is a sectional view illustrating error in the scan axes of the shaft holes of a carriage assembly.

FIG. 2A is a sectional view illustrating disparity in the central axes of the shaft holes of a carriage assembly, and FIG. 2B is a sectional view illustrating error in the scan axes of the shaft holes of a carriage assembly for a movable print head. Referring to FIG. 2A, the shaft hole 15 formed at the boss 14 has an axis S, and the shaft hole 15' formed at the boss 14' has an axis S', and the axes S and S' are not aligned with each other. Referring to FIG. 2B, the central axes s and s' of the shaft hole 15 formed at the boss 14 and the shaft hole 15' formed at the boss 14' are not aligned with each other. As shown in FIGS. 2A and 2B, in the case that the carriage is formed by using a mold, the reason why a disparity and error in the central axes of the shaft holes 15 and 15' occur is due to a problem in injection molding using a mold.

In order to solve the problem, when the carriage 10 is made of a metallic material to align the axes of the shaft holes 15 and 15' with each other, it is undesirable that the weight of the carriage 10, which must move side to side repeatedly for printing, becomes heavy, and additionally the load applied to the guiding rod (not shown) becomes greater. Therefore, a carriage made of a light resin is usually used.

Consequently, while the carriage is made of a resin material to which a highly lubricating additive is added, the shaft holes are formed so as to be greater than the size necessary to allow a straight guiding rod to pass through both shaft holes at the same time. As a result, a fitting structure for appropriately fitting the guiding rod within the shaft holes must be employed to prevent unsteady movement of the carriage.

Figure 3A:
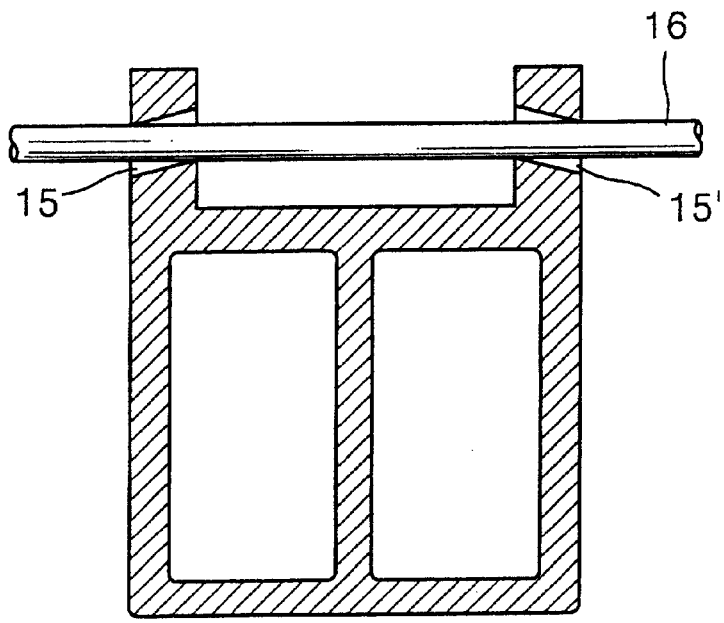
FIGS. 3A through 3C are sectional views illustrating examples of fitting structures for preventing unsteady movement of a carriage assembly.
Figure 3B:
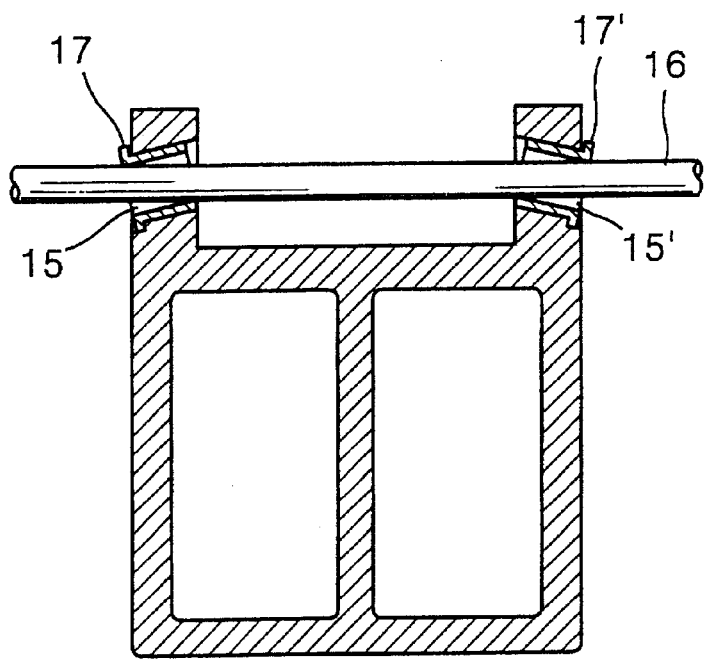
Figure 3C:
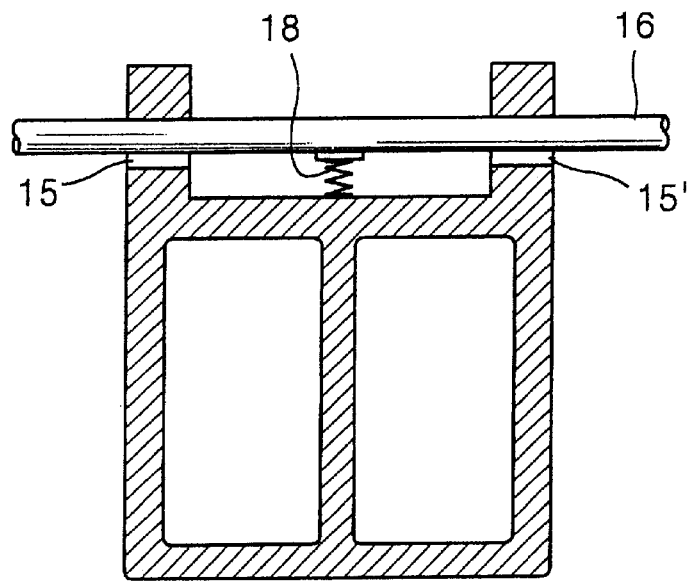

Examples of shaft holes provided with a fitting structure are shown in FIGS. 3A through 3C. FIG. 3A shows an example in which shaft holes 15 and 15' are formed to be inclined at a predetermined angle while facing each other, and the scan axis of the shaft holes 15 and 15' is aligned with the axis of a guiding rod 16. FIG. 3B shows an example in which, after bushings 17 and 17' are inserted into the respective shaft holes 15 and 15' shown in FIG. 3A, the guiding rod 16 is installed to pass through the bushings 17 and 17'. FIG. 3C shows an example in which shaft holes 15 and 15' are formed so that the axes thereof are parallel to each other, and a spring 18 for supporting the guiding rod 16 is installed so that the scan axis of the shaft holes 15 and 15' can be aligned with the guiding rod 16.

Figure 3D:
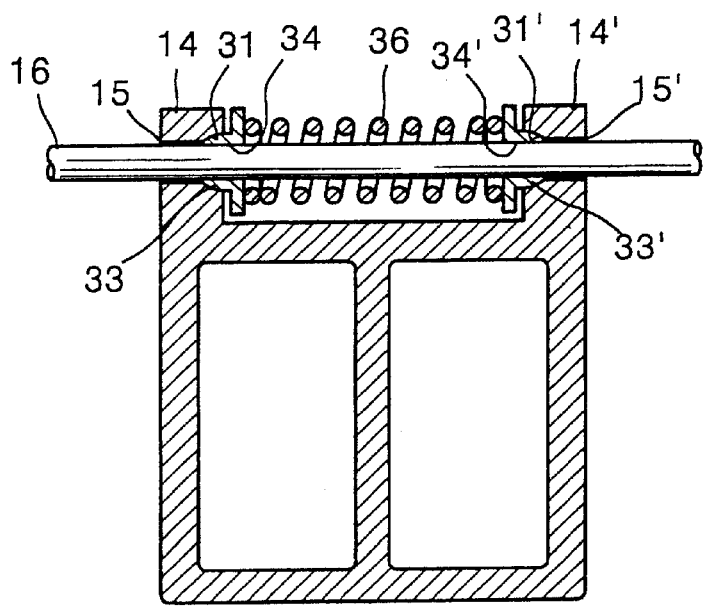
FIG. 3D is a sectional view illustrating a carriage assembly for a cartridge with printhead according to prior art.

Another example of a fitting structure is shown in FIG. 3D. The example shown in FIG. 3D is disclosed in Korean Utility Model Publication No. 1998-017748 published Jul. 6, 1998, filed by the applicant of this application. Referring to FIG. 3D, hemispherical grooves 31 and 31' are formed at inner sides of respective shaft holes 15 and 15' of bosses 14 and 14', the hemispherical grooves 31 and 31' each accommodating bushings 33 and 33' respectively having a shape corresponding to the hemispherical grooves 31 and 31'. Bushings 33 and 33' are inserted into the hemispherical grooves 31 and 31', respectively. Shaft through-holes 34 and 34', through which a guiding rod 16 is inserted, perforate bushings 33 and 33' respectively. In addition, a spring 36 is installed between the bushings 33 and 33', and the bushings 33 and 33' are supported by the elastic force of the spring 36 so that the bushings 33 and 33' can be prevented from being separated from the shaft holes 15 and 15' respectively.

When a carriage has the above-described configuration, there are problems in which the spring is weakened when the spring is used for a long time. In addition, since the hemispherical grooves 31 and 31' are formed at inner sides facing each other at the bosses 14 and 14', respectively, the structure of FIG. 3D is difficult and expensive to manufacture. If injection molding is employed, the mold becomes complicated. If machining is employed, the forming of the hemispherical grooves 31 and 31' is difficult to achieve.

Figure 4:
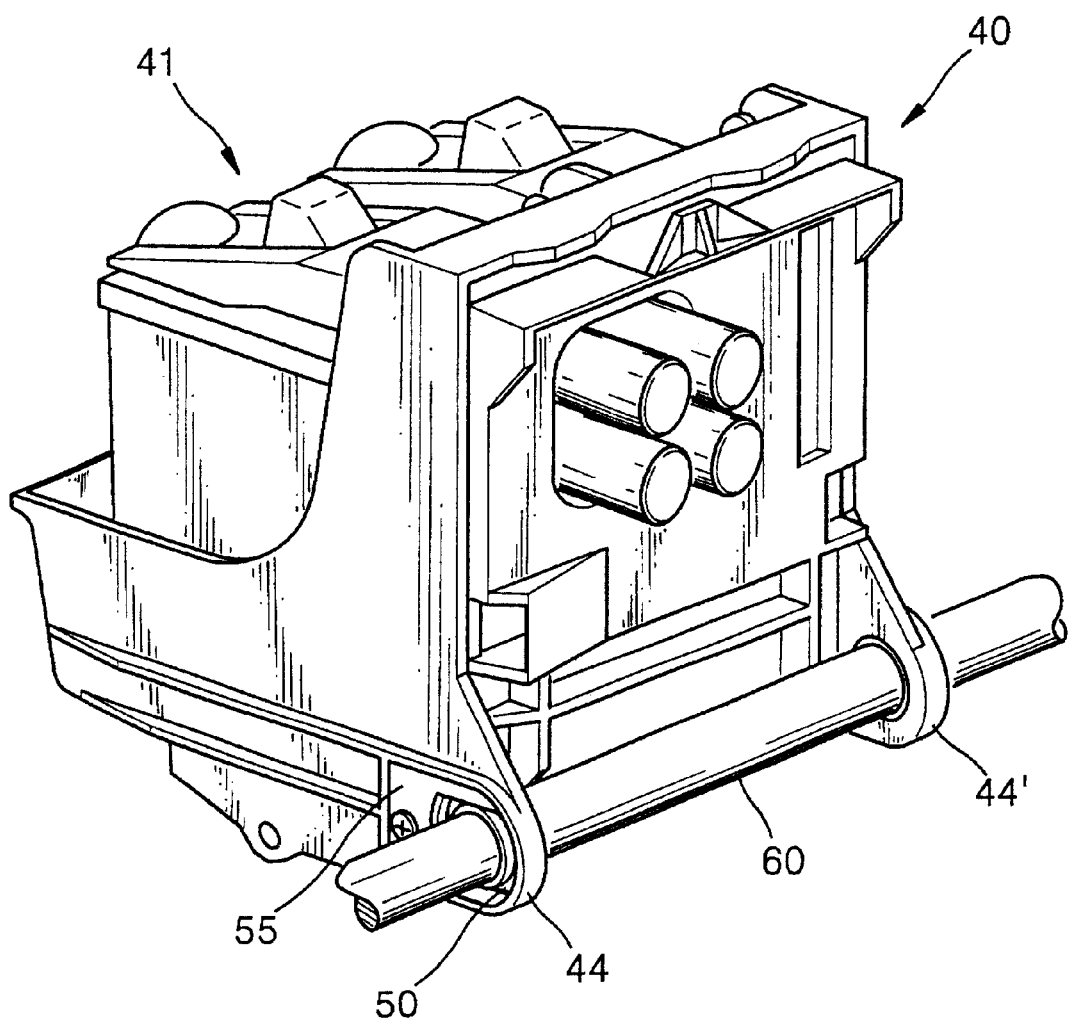
FIG. 4 is a perspective view illustrating a carriage assembly for a cartridge having a movable print head according to an embodiment of the present invention.
Figure 5:
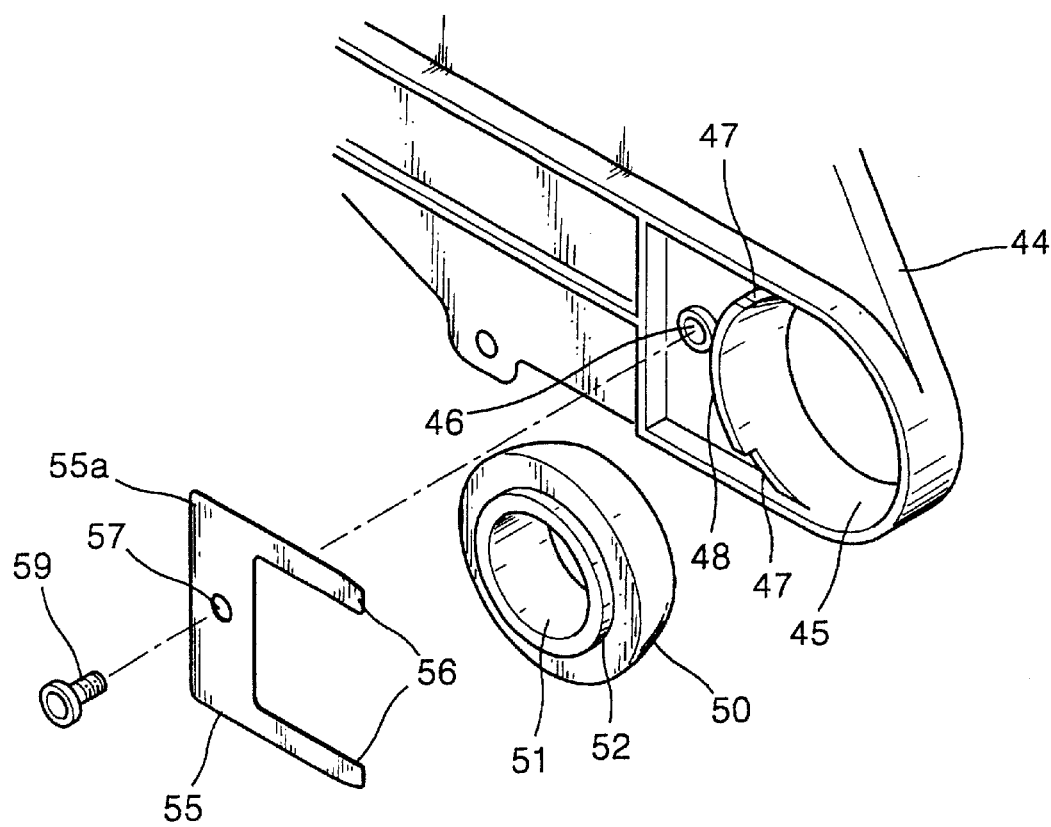
FIG. 5 is an exploded perspective view of the carriage assembly shown in FIG. 4.
Figure 6:
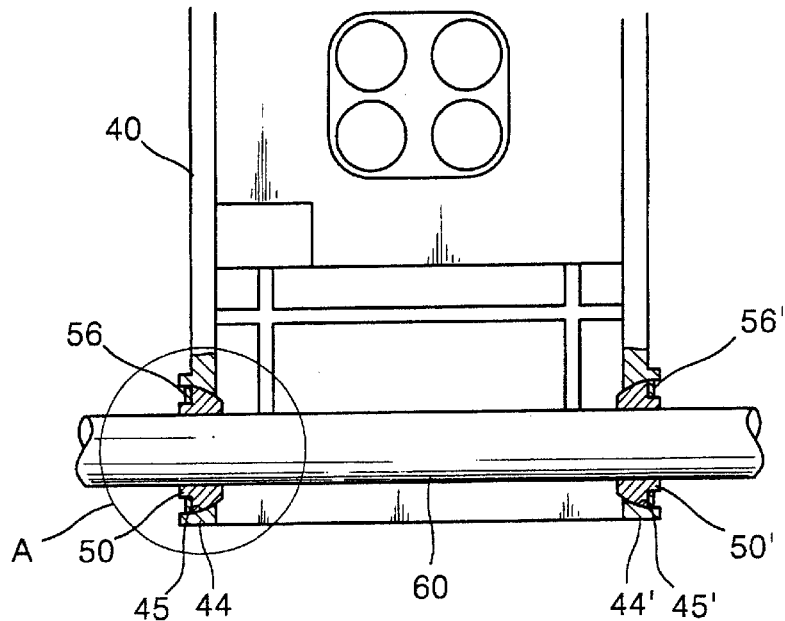
FIG. 6 is a sectional view of the carriage assembly shown in FIG. 4.

FIG. 4 is a perspective view illustrating a carriage assembly 42 having a carriage 40 holding a cartridge 41 having a movable print head according to an embodiment of the present invention, FIG. 5 is an exploded perspective view of a portion of the carriage 40 as shown in FIG. 4, and FIG. 6 is a sectional view of the carriage assembly 42 shown in FIG. 4. Although the explanation of FIGS. 5, 6, 7 and 8 may at times be directed to one side of carriage 40 at boss 44, it is to be understood that each of the features discussed in the ensuing paragraphs also apply to boss 44' on the other side of carriage 40, including boss hole 45, bushing (or bearing bushing) 50', plate spring type supporting portion 56', etc. In other words, all parts and features on each side of carriage 40 are identical.

Referring to FIGS. 4, 5, and 6, a carriage assembly according to the present invention includes a carriage 40 into which a cartridge 41 having a print head is inserted, and bosses 44 and 44' which are provided at a side of the carriage 40 so as to be spaced a predetermined distance from each other, and which are perforated by respective boss holes 45 and 45'. Bushings 50 and 50' are inserted into the boss holes 45 and 45', respectively, and can rotate freely. Supporting plates 55 and 55' having supporting portions 56 and 56' are employed for pressing the bushings 50 and 50' inserted into the boss holes 45 and 45' and to prevent bushings 50 and 50' from being separated from the boss holes 45 and 45'.

Each bushing 50 or 50' is perforated with a shaft through-hole 51 so that the guiding rod 60 can pass through the shaft through-hole 51. The outer surface of each bushing is formed to have a predetermined radius of curvature. The inner circumferential surface of each of boss holes 45 and 45' is formed to have a sufficiently larger radius of curvature compared to the radius of curvature of the outer surface of the bushings 50 and 50', respectively. The outer surfaces of bushings 50 and 50', as well as the inner surfaces of boss holes 45 and 45', each trace out portions of concentric spheres having different radii. In addition, an annular projecting portion 52 which surrounds the guiding rod 60 so that the bushings 50 and 50' can be pressed by the supporting portions 56 of the supporting plate 55 is formed at each of bushings 50 and 50'. The bushing 50 is inserted into the boss hole 45. Each supporting plate 55 includes a base 55a, and plate-spring type supporting portions 56 which extend in parallel from both ends of the base 55a. The supporting portions 56 are positioned to surround the annular projecting portion 52, and provide elastic forces so that the bushing 50 can be prevented from being separated from the boss hole 45, and, in addition, the bushing 50 through which the guiding rod 60 is inserted can rotate freely in the boss hole 45 due to the differences in radii between each supporting hole and each bushing, allowing the scan axis of the carriage assembly to be aligned with the axis of the guiding rod 60. Therefore, it is desirable that the supporting portions 56 of the supporting plate 55 have a sufficient elastic force to elastically press the bearing bushing 50.

A screw passing hole 57 for allowing a screw 59 to pass through it is formed in the base 55a of the supporting plate 55 so that the supporting plate 55 can be fastened to the boss 44 by screwing the screw 59 into a threaded hole 46 formed at the boss 44. Recessed portions 47 having a predetermined depth are formed at an outer circumferential surface 48 of the boss hole 45 so that the supporting portions 56 can be installed at the boss 44 and press the bushing 50 into boss hole 45. Therefore, the supporting portions 56 of the supporting plate 55 are installed in the recessed portions 47 so as to surround the annular projecting portion 52 of the bushing 50.

Figure 7:
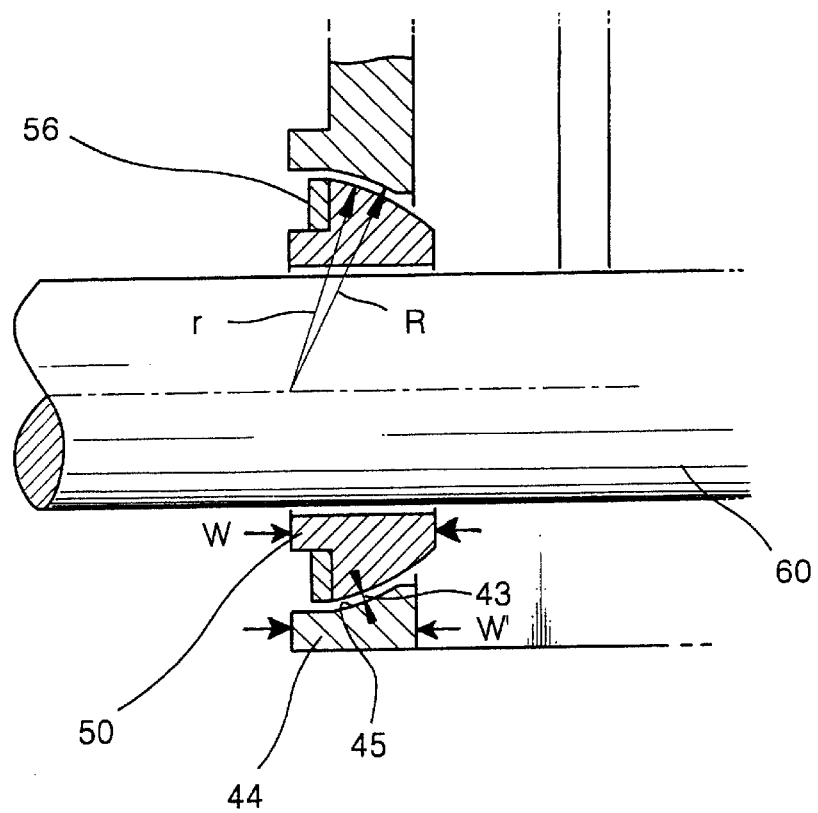
FIG. 7 is an enlarged view illustrating the portion A shown in FIG. 6.
Figure 8:
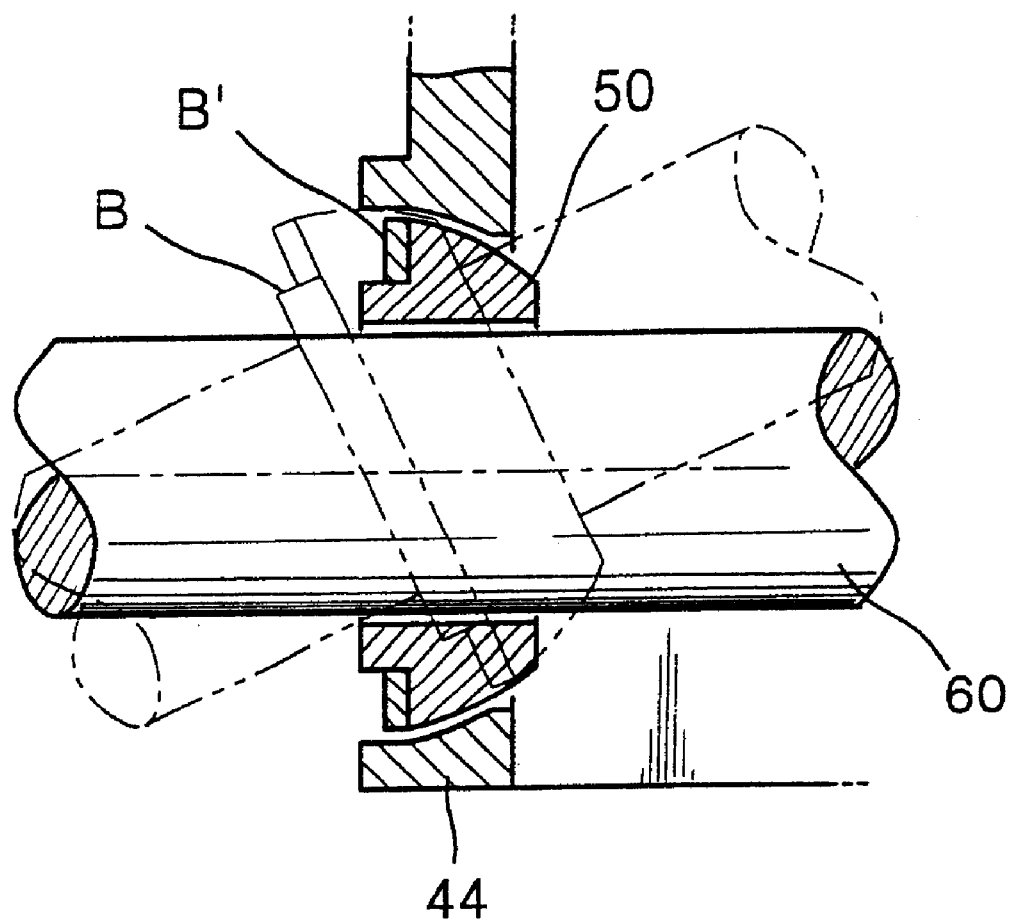
FIG. 8 is a diagram illustrating a mechanism allowing a bearing bushing. according to an embodiment of the present invention, to freely rotate in a bearing supporting hole so that the scan axis of a carriage assembly can be aligned with the axis of a guiding rod.

FIG. 7 is an enlarged sectional view of the portion A shown in FIG. 6. Referring to FIG. 7, it is preferable that the inner radius R of the boss hole 45 be formed so as to be substantially greater than the outer radius r of the bushing 50 so that the boss hole 45 can be spaced a predetermined distance 43 from the bushing 50. This is designed to allow the bushing 50 to freely rotate with respect to the boss hole 45 so that the scan axis of the carriage can be aligned with the axis of the guiding rod 60. In the carriage of a printer configured as described above according to the present invention, a mechanism in which the scan axis of the carriage assembly is aligned with the axis of the guiding rod 60 will be described as follows. Also, FIG. 7 along with FIGS. 5, 6 and 8 illustrate bushing 50 having a width W at least as large as the width W' of the boss of carriage 40. In addition, the bushings 50 and 50' are coextensive with the width W' of boss 44 and 44', respectively. These features allow for even greater flexibility in rotating guiding rod 60 in each boss 44 and 44' than previously disclosed in FIG. 3D. In FIG. 3D, guiding rod 16 is less able to rotate freely because bushing 33 and 33' are not coextensive with shaft holes 15 and 15', and the width of bearing bushings 33 and 33' are smaller than the width of bosses 14 and 14', respectively, resulting in less ability to adapt a guiding rod through plastic or resin carriage containing a pair of holes spaced apart relative to that accomplished by the present invention illustrated in FIGS. 4, 5, 6, 7 and 8.

FIG. 8 is a diagram illustrating a mechanism allowing a bushing 50 to freely rotate in a boss hole 45 so that the scan axis of a carriage assembly can be aligned with the axis of a guiding rod. Referring to FIGS. 5 and 8, the carriage 40 is moved along the guiding rod 60 by a drive system (not shown). At this time, the bushing 50, through which the guiding rod 60 is inserted, can rotate in the boss hole 45. Therefore, even when the boss hole 45 is erroneously machined to some extent, the scan axis of the carriage 40 can be aligned with the axis of the guiding rod 60.

That is, even when the boss holes 45 and 45' are erroneously machined so as not to receive the respective bushings 50 and 50' correctly, since the bushings 50 and 50' have a radius of curvature sufficiently smaller than that of the boss holes 45 and 45', bushings 50 and 50' can rotate freely from a state B shown in dotted lines to a state B' shown in solid lines in FIG. 8, and the scan axis of the carriage assembly can be aligned with the axis of the guiding rod 60.

Therefore, the carriage assembly of a printer having a structure as described above has a simple structure and the manufacturing cost thereof is low. In addition, since unsteady movement of the carriage can be reduced, and the scan axis of the carriage assembly can be aligned with the axis of the guiding rod automatically, error in the axes of the carriage assembly and the guiding rod can be reduced markedly.

As described above, the bearing bushings having a predetermined radius of curvature can rotate freely in the respective bearing supporting holes having a different but corresponding radius of curvature, and the scan axis of the carriage assembly can be aligned with the axis of the guiding rod automatically even when the bearing supporting holes are erroneously machined. This results in the manufacturing cost of the carriage assembly according to the present invention being low, and unsteady movement of the carriage assembly can be reduced markedly.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A carriage assembly of a printer having a carriage, a cartridge and a guiding rod, said cartridge having a print head, said cartridge and said carriage being movable along said guiding rod, said carriage comprising:

a pair of bosses provided at respective sides of the carriage so as to be spaced a predetermined distance from each other, each boss being perforated by a boss hole, each boss hole having sidewalls having a shape of a portion of a sphere having a first radius;

a pair of bushings, each of which is installed in a respective one of said boss holes of the bosses, each one of said pair of bushings having an outer surface that forms a portion of a sphere having a second radius different from said first radius, said sidewalls of each one of said boss holes being equidistant with said outer surface of said respective one of said pair of bushings, each bushing being perforated with a shaft throughhole through which said guiding rod can slidably pass; and supporting plates one for each bushing, each supporting plate having supporting portions for pressing said each bushing so as to prevent said each bushing installed in said respective one of said boss holes from being separated therefrom, said each supporting plate being fastened to a respective one of said bosses, said each bushing having an annular projection portion which projects between the supporting portions of said each supporting plate, said each bushing surrounding the guiding rod.

2. The carriage assembly of claim 1, wherein the supporting portions of said each supporting plate have a predetermined elastic force so as to elastically press against said each bushing.

3. A carriage assembly of a printer having a carriage, a cartridge and a guiding rod, said cartridge having a print head, said cartridge and said carriage being movable along said guiding rod, said carriage comprising:
   a pair of bosses provided at respective sides of the carriage so as to be spaced a predetermined distance from each other, each boss being perforated by a boss hole, each boss hole having sidewalls having a shape of a portion of a sphere having a first radius; and
   a pair of bushings, each of which is installed in a respective one of said boss holes of the bosses, each one of said pair of bushings having an outer surface that forms a portion of a sphere having a second radius different from said first radius, said sidewalls of each one of said boss holes being equidistant with said outer surface of said respective one of said pair of bushings, each bushing being perforated with a shaft through-hole through which said guiding rod can slidably pass;
   wherein said first radius is sufficiently greater than said second radius so that said each bushing can rotate freely in said respective one of said boss holes.

4. A carriage assembly of a printer having a carriage, a cartridge and a guiding rod, said cartridge having a print head, said cartridge and said carriage being movable along said guiding rod, said carriage comprising:
   a pair of bosses provided at respective sides of the carriage so as to be spaced a predetermined distance from each other, each boss being perforated by a boss hole, each boss hole having sidewalls having a shape of a portion of a sphere having a first radius; and
   a pair of bushings, each of which is installed in a respective one of said boss holes of the bosses, each one of said pair of bushings having an outer surface that forms a portion of a sphere having a second radius different from said first radius, said sidewalls of each one of said boss holes being equidistant with said outer surface of said respective one of said pair of bushings, each bushing being perforated with a shaft through-hole through which said guiding rod can slidably pass;
   wherein each of said pair of bushings is coextensive with a width of a respective one of said bosses.

5. A carriage supporting a cartridge which supports a print head, said carriage being movable along a guiding rod during a printing operation, said carriage comprising:
   a pair of ring-shaped bosses, each boss being disposed at a respective opposite end of said carriage, said bosses surrounding two portions of said guiding rod at all times, said two portions being separated by a width of said carriage, each of said bosses being perforated by a boss hole, each said boss hole having a sidewall that forms a portion of a first sphere having a first radius; and
   a pair of ring-shaped bushings which are perforated by a through hole, each of said ring-shaped bushings having an outer surface that forms a portion of a second sphere having a second radius smaller than said first radius, each of said pair of bushings fitting within a respective one of said boss holes;
   wherein said second radius of said second sphere is sufficiently smaller than said first radius of said first sphere so that each of said pair of bushings can rotate freely within said respective one of said boss holes.

6. The carriage of claim 5, wherein said second sphere is concentric to said first sphere.

7. The carriage of claim 5, wherein each of said pair of bushings is inserted into a respective one of said boss holes so that a narrow end of said each of said pair of bushings is located on a side of said one of said pair of bosses remote from another of said pair of bosses.

8. A carriage supporting a cartridge which supports a print head, said carriage being movable along a guiding rod during a printing operation, said carriage comprising:
   a pair of ring-shaped bosses, each boss being disposed at a respective opposite end of said carriage, said bosses surrounding two portions of said guiding rod at all times, said two portions being separated by a width of said carriage, each of said bosses being perforated by a boss hole, each said boss hole having a sidewall that forms a portion of a first sphere having a first radius;
   a pair of ring-shaped bushings which are perforated by a through hole, each of said ring-shaped bushings having an outer surface that forms a portion of a second sphere having a second radius smaller than said first radius, each of said pair of bushings fitting within a respective one of said boss holes; and
   a pair of supporting plates, each supporting plate having a pair of supporting portions pressing a respective one of said pair of bushings for preventing the bushings installed in the boss holes from being separated from the boss holes, said each supporting plate being fastened to a boss, each of said bushings having an annular projection portion which projects between the supporting portions of a corresponding supporting plate, said bushings surrounding the guiding rod.

9. The carriage of claim 8, wherein the supporting portions of said each supporting plate have a predetermined elastic force so as to elastically press against said respective one of said pair of bushings.

10. The carriage of claim 8, wherein said second sphere is concentric to said first sphere.

11. The carriage of claim 8, wherein each of said pair of bushings is inserted into a respective one of said boss holes so that a narrow end of said each of said pair of bushings is located on a side of said one of said pair of bosses remote from another of said pair of bosses.

12. A carriage supporting a cartridge which supports a print head, said carriage being movable along a guiding rod during a printing operation, said carriage comprising:
   a pair of ring-shaped bosses, each boss being disposed at a respective opposite end of said carriage, said bosses surrounding two portions of said guiding rod at all times, said two portions being separated by a width of said carriage, each of said bosses being perforated by a boss hole, each said boss hole having a sidewall that forms a portion of a first sphere having a first radius; and
   a pair of ring-shaped bushings which are perforated by a through hole, each of said ring-shaped bushings having an outer surface that forms a portion of a second sphere having a second radius smaller than said first radius, each of said pair of bushings fitting within a respective one of said boss holes;
   wherein each of said bushings is coextensive with a width of a respective one of said bosses.

13. The carriage of claim 12, wherein said second sphere is concentric to said first sphere.

14. The carriage of claim 12, wherein each of said pair of bushings is inserted into a respective one of said boss holes so that a narrow end of said each of said pair of bushings is located on a side of said one of said pair of bosses remote from another of said pair of bosses.

15. A carriage supporting a cartridge which supports a print head, said carriage being movable along a guiding rod during a printing operation, said carriage comprising:
   a pair of bosses perforated by boss holes, each said boss hole having a narrow end and a wide end, each said boss being disposed at a respective opposite end of said carriage so that said bosses are separated from each other by a width of said carriage;
   a pair of bushings, each of which fits inside a corresponding one of said boss holes, each said bushing having an annular groove concentric with said guiding rod that faces said wide end of said boss hole; and
   a pair of supporting plates, each having a pair of supporting portions pressing a respective one of said pair of bushings for preventing the bushings installed in the boss holes from being separated from the boss holes, each said supporting plate being fastened to a corresponding one of said bosses, each said bushing surrounding the guiding rod.

16. The carriage of claim 15, wherein the supporting portions of each said supporting plate have a predetermined elastic force so as to elastically press each said bushing into a corresponding one of said boss holes.

17. The carriage of claim 15, wherein each of said bushings is coextensive with a width of a respective one of said bosses.

18. The carriage of claim 17, wherein said carriage is made of a resin material, and wherein only the bushings comprise a lubricating additive.

19. The carriage of claim 15, wherein each said boss hole has a sidewall forming a curved surface, each said bushing having an outer surface that is curved and having a profile the same as said curved surface of said sidewall of each said boss hole, thereby enabling each said bushing to rotate freely in a corresponding one of said boss holes.

* * * * *